United States Patent
Kelly et al.

(10) Patent No.: US 6,180,697 B1
(45) Date of Patent: Jan. 30, 2001

(54) METHOD FOR PREPARATION OF STABLE BITUMEN POLYMER COMPOSITIONS

(75) Inventors: Kevin P. Kelly, Friendswood; James R. Butler, Houston, both of TX (US)

(73) Assignee: Fina Technology, Inc., Houston, TX (US)

( * ) Notice: Under 35 U.S.C. 154(b), the term of this patent shall be extended for 0 days.

(21) Appl. No.: 09/389,785

(22) Filed: Sep. 4, 1999

(51) Int. Cl.[7] .................................................. C08L 95/00
(52) U.S. Cl. .................................... 524/59; 524/60; 524/62; 524/68; 524/69; 524/70; 524/71
(58) Field of Search ....................... 524/59, 68, 69, 524/70, 71, 60, 61, 62

(56) References Cited

U.S. PATENT DOCUMENTS

| | | | |
|---|---|---|---|
| 3,803,066 | 4/1974 | Petrossi | 524/71 |
| 4,129,542 | 12/1978 | Matheson et al. | 524/70 |
| 4,130,516 | 12/1978 | Gagle et al. | 524/71 |
| 4,412,019 | 10/1983 | Kraus | 524/71 |
| 4,503,176 | 3/1985 | Barlow et al. | 524/62 |
| 4,740,322 | 4/1988 | DiBiase et al. | 252/47.5 |
| 4,956,500 | 9/1990 | Vermilion | 525/54.5 |
| 5,017,230 | 5/1991 | Hopkins et al. | 106/284.3 |
| 5,078,905 | 1/1992 | Trinh et al. | 252/182.17 |
| 5,120,777 | 6/1992 | Chaverot et al. | 524/62 |
| 5,151,456 | 9/1992 | Elias et al. | 524/60 |
| 5,314,935 | 5/1994 | Chaverot et al. | 524/64 |
| 5,371,121 | 12/1994 | Bellomy et al. | 524/68 |
| 5,382,612 * | 1/1995 | Chaverot et al. | 524/68 |
| 5,428,085 * | 6/1995 | Burel et al. | 524/68 |
| 5,508,112 | 4/1996 | Planche et al. | 428/489 |
| 5,605,946 | 2/1997 | Planche et al. | 524/68 |
| 5,618,862 | 4/1997 | Germanaud et al. | 524/68 |
| 5,672,642 | 9/1997 | Gros | 524/68 |
| 5,710,196 | 1/1998 | Willard | 524/68 |
| 5,733,955 | 3/1998 | Schulz et al. | 524/69 |
| 5,756,563 | 5/1998 | Brandolese et al. | 523/351 |
| 5,756,565 | 5/1998 | Germanaud et al. | 524/68 |
| 5,773,496 | 6/1998 | Grubba | 524/68 |
| 5,795,929 | 8/1998 | Grubba | 524/60 |
| 5,807,911 | 9/1998 | Drieskens et al. | 524/68 |
| 5,874,492 * | 2/1999 | Planche et al. | 524/68 |
| 5,880,185 * | 3/1999 | Planche et al. | 524/68 |

* cited by examiner

Primary Examiner—Peter A. Szekely
(74) Attorney, Agent, or Firm—Roberts Abokhair & Mardula, LLC; Jim Wheelington

(57) ABSTRACT

The present invention provides a method for preparing an asphalt and thermoplastic elastomer composition. The process comprises heating an asphalt cut in a stirred tank to a temperature sufficient to allow the stirring of the asphalt in the tank. A thermoplastic elastomer or rubber is added to the asphalt while continuing to stir the asphalt. The mixture is stirred at a speed and for a period of time sufficient to increase the distribution of the elastomer into the asphalt. The stirring speed is reduced and the temperature is increased to add an oil dispersion of crosslinking agents to the tank. Stirring is continued for a period of time sufficient to improve the distribution of the crosslinking agent dispersion in the asphalt.

18 Claims, No Drawings

METHOD FOR PREPARATION OF STABLE BITUMEN POLYMER COMPOSITIONS

BACKGROUND OF THE INVENTION

This invention is directed to bitumen compositions, which are prepared from bitumen, polymers such as copolymers of styrene and a conjugated-diene, and defined amounts of crosslinking agents such as sulfur. The bitumen compositions described herein are useful in industrial applications, such as in hot mix asphalts useful in preparing aggregates for road paving.

The use of bitumen (asphalt) compositions in preparing aggregate compositions (bitumen+rock) useful as road paving material is complicated by at least three factors, each of which imposes a serious impediment to providing an acceptable product. First, the bitumen compositions must meet certain performance criteria or specifications in order to be considered useful for road paving. For example, to ensure acceptable performance, state and federal agencies issue specifications for various bitumen applications including specifications for use as road pavement. Current Federal Highway Administration specifications designate a bitumen (asphalt) product, for example, AC-20R as meeting defined parameters relating to properties such as viscosity, toughness, tenacity and ductility (see Table 1). Each of these parameters define a critical feature of the bitumen composition, and compositions failing to meet one or more of these parameters will render that composition unacceptable for use as road pavement material.

Conventional bitumen compositions frequently cannot meet all of the requirements of a particular specification simultaneously and, if these specifications are not met, damage to the resulting road can occur, including permanent deformation, thermally induced cracking and flexural fatigue. This damage greatly reduces the effective life of paved roads.

In this regard, it has long been recognized that the properties of conventional bitumen compositions can be modified by the addition of other substances, such as polymers. A wide variety of polymers have been used as additives in bitumen compositions. For example, copolymers derived from styrene and conjugated dienes, such as butadiene or isoprene, are particularly useful, since these copolymers have good solubility in bitumen compositions and the resulting modified-bitumen compositions have good rheological properties.

It is also known that the stability of polymer-bitumen compositions can be increased by the addition of crosslinking agents such as sulfur, frequently in the form of elemental sulfur. It is believed that the sulfur chemically couples the polymer and the bitumen through sulfide and/or polysulfide bonds. The addition of extraneous sulfur is required to produce the improved stability, even though bitumens naturally contain varying amounts of native sulfur.

Thus, U.S. Pat. No. 4,145,322, issued Mar. 20, 1979 to Maldonado et al., discloses a process for preparing a bitumen-polymer composition consisting of mixing a bitumen, at 266°–446® F. (130°–230° C.), with 2 to 20% by weight of a block copolymer, having an average molecular weight between 30,000 and 300,000, with the theoretical formula $S_x$–$B_y$, in which S corresponds to styrene structure groups and B corresponds to conjugated diene structure groups, and x and y are integers. The resulting mixture is stirred for at least two hours, and then 0.1 to 3% by weight of sulfur relative to the bitumen is added and the mixture agitated for at least 20 minutes. The preferred quantity of added sulfur cited in this patent is 0.1 to 1.5% by weight with respect to the bitumen. The resulting bitumen-polymer composition is used for road-coating, industrial coating, or other industrial applications.

Similarly, U.S. Pat. No. 4,130,516, issued Dec. 19, 1978 to Gagle et al., discloses an asphalt (bitumen) polymer composition obtained by hot-blending asphalt with 3 to 7% by weight of elemental sulfur and 0.5 to 1.5% by weight of a natural or synthetic rubber, preferably a linear, random butadiene/styrene copolymer. U.S. Pat. No. 3,803,066, issued Apr. 9, 1974 to Petrossi, also discloses a process for preparing a rubber-modified bitumen by blending rubber, either natural or synthetic, such as styrene/butadiene rubber, with bitumen at 293°–365° F. (145°–185° C.), in an amount up to 10% by weight based on the bitumen, then adjusting the temperature to 257°–320° F. (125°–160° C.), and intimately blending into the mix an amount to sulfur such that the weight ratio of sulfur to rubber is between 0.3 and 0.9. A catalytic quantity of a free-radical vulcanization-accelerator is then added to effect vulcanization. This patent recites the critical nature of the sulfur to rubber ratio, and teaches that weight ratios of sulfur to rubber of less than 0.3 gives modified bitumen of inferior quality.

Although polymer-modified bitumen compositions are known, these previously described compositions are not necessarily useful for road paving applications. For example, mixing NorthWest paving asphalt having an initial viscosity of 682 poise at 140° F. (60° C.) with 3.6 weight percent Kraton®-4141, a commercially available styrene-butadiene tri-block copolymer which contains 29 weight percent plasticizer oil, and 0.25% sulfur gives a modified-asphalt composition with a viscosity of 15,000 poise at 140° F. (60° C.). This viscosity, however, greatly exceeds the acceptable viscosity range set by the widely-used AC-20R specification for paving asphalt. This specification, issued by the Federal Highway Administration, requires bitumen compositions to have a viscosity in the range of 1600–2400 poise at 140° F. (60° C.). Thus, the modified bitumen compositions produced by the procedures of U.S. Pat. No. 4,145,322 using Kraton®-4141 would be unacceptable for use in road paving under the AC-20R specification.

The second factor complicating the use of bitumen compositions concerns the viscosity stability of such compositions under storage conditions. In this regard, bitumen compositions are frequently stored for up to 7 days or more before being used and, in some cases, the viscosity of the composition can increase so much that the bitumen composition is unusable for its intended purpose. On the other hand, a storage stable bitumen composition would provide for only minimal viscosity increases and, accordingly, after storage it can still be employed for its intended purpose.

The third factor complicating the use of bitumen compositions concerns the use of volatile solvents in such compositions. Specifically, while such solvents have been heretofore proposed as a means to fluidize bitumen-polymer compositions containing relatively small amounts of sulfur which compositions are designed as coatings (Maldonado et al., U.S. Pat. No. 4,242,246), environmental concerns restrict the use of volatile solvents in such compositions. Moreover, the use of large amounts of volatile solvents in bitumen compositions may lower the viscosity of the resulting composition so that it no longer meets viscosity specifications designated for road paving applications. In addition to the volatile components, reduction of other emissions during asphalt applications becomes a target. For example, it is desirable to reduce the amount of sulfur compounds that are emitted during asphalt applications.

Asphaltic concrete, typically including asphalt and aggregate, asphalt compositions for resurfacing asphaltic concrete, and similar asphalt compositions must exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

Previously, various polymers have been added to asphalts to improve physical and mechanical performance properties. Polymer-modified asphalts are routinely used in the road construction/maintenance and roofing industries. Conventional asphalts often do not retain sufficient elasticity in use and, also, exhibit a plasticity range which is too narrow for use in many modern applications such as road construction. It is known that the characteristics of road asphalts and the like can be greatly improved by incorporating into them an elastomeric-type polymer which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained commonly are referred to variously as bitumen/polymer binders or asphalt/polymer mixes. Modified asphalts and asphalt emulsions typically are produced utilizing styrene/butadiene based polymers, and typically have raised softening point, increased viscoelasticity, enhanced force under strain, enhanced strain recovery, and improved low temperature strain characteristics.

The bituminous binders, even of the bitumen/polymer type, which are employed at the present time in road applications often do not have the optimum characteristics at low enough polymer concentrations to consistently meet the increasing structural and workability requirements imposed on roadway structures and their construction. In order to achieve a given level of modified asphalt performance, various polymers are added at some prescribed concentration.

Current practice is to add the desired level of a single polymer, sometimes along with a reactant which promotes cross-linking of the polymer molecules until the desired asphalt properties are met. This reactant typically is sulfur in a form suitable for reacting. Such current processes are discussed in various patents such as U.S. Pat. Nos. 4,145,322 (Maldonado); 5,371,121 (Bellamy); and 5,382,612 (Chaverot), all of which are hereby incorporated by reference.

However, cost of the polymer adds significantly to the overall cost of the resulting asphalt/polymer mix. Thus, cost factors weigh in the ability to meet the above criteria for various asphalt mixes. In addition, at increasing levels of polymer concentration, the working viscosity of the asphalt mix becomes excessively great and separation of the asphalt and polymer may occur.

One result of the high viscosities experienced at increased polymer concentrations is that it makes emulsification of the asphalt difficult. As is known in the art and used herein, emulsification of asphalt refers to forming an emulsion of asphalt and water. Asphalt emulsions are desirable in many applications because the emulsion may be applied at lower temperatures than hot-mix asphalts because the water acts as a carrier for the asphalt particles.

For example, hot-mix asphalts, mixes of asphalt, aggregate, and a single polymer, commonly are applied at a temperature of 350° Fahrenheit (F.) to 450° F. (177° Centigrade (C.) to 232° C.) to achieve the requisite plasticity for application. In comparison, an asphalt emulsion typically may be applied at 130° F. to 170° F. (54° C. to 77° C.) to achieve the same working characteristics. Emulsified asphalt products are generally used to reduce the release of environmentally-harmful volatile organic compounds normally associated with asphalts diluted with light carrier solvents such as diesel fuel, naphtha, and the like. Emulsification basically requires that the asphalt and any desired performance-enhancing additives be combined with an emulsifying agent in an emulsification mill along with about 20 to 40 percent by weight of water. However, high polymer loading in an asphalt produces high viscosities and melting points, making emulsification of the polymer-asphalt composition difficult.

The bitumen/polymer compositions are prepared in practice at polymer contents range from about 3% to 6% by weight of bitumen depending on the nature and the molecular weight of the polymer and the quality of the bitumen. Gelling of the bitumen/polymer composition, which is observed fairly frequently during the preparation of the said composition or while it is stored, occurs as soon as the polymer content of this composition exceeds the above-mentioned threshold. It is thus difficult, in practice, to produce non-gellable bitumen/polymer compositions with a high polymer content, which would act as bitumen/polymer concentrates, and are more economical to prepare and to transport than bitumen/polymer compositions with a lower polymer content, and which could be diluted at the time of use, by addition of bitumen, in order to obtain the corresponding bitumen/polymer binders with a lower polymer content which are usually used to make coatings.

In view of the above, bitumen compositions, which simultaneously meet the performance criteria required for road paving, and which are substantially free of volatile solvent would be advantageous. Additionally, viscosity stable bitumen compositions would be particularly advantageous. Further, a method for efficiently introducing the polymer into the bitumen composition would be desirable. In preparing the composition, significant mixing is needed to insure the uniform addition of both the polymer and any crosslinking agents. The crosslinking agents are usually added as a dry powder and mixed with the asphalt compositions.

mixture in the tank. The concentration of the crosslinking agents in the overall composition in the tank should be at least 0.02 percent by weight of zinc-mercaptobenzothiazole and 0.06 percent by weight of sulfur. Elemental sulfur is preferred but sulfur donating compounds are also utilized. Zinc oxide may also be added as part of the crosslinking composition. The crosslinking agents are added in various forms such as dry components, in an oil dispersion, or as a

TABLE 1

Properties of Various Asphalt Grades

AASHTO M-226

| TEST | AC 2.5 | AC 5 | AC 10 | AC 20 | AC 30 | AC 40 |
|---|---|---|---|---|---|---|
| Viscosity @ 140° F., poise (AASHTO T-202) | 250 ± 50 | 500 ± 100 | 1000 ± 200 | 2000 ± 400 | 3000 ± 600 | 4000 ± 800 |
| Viscosity @ 275° F.; cSt, minimum (AASHTO T-201) | 125 | 175 | 250 | 300 | 350 | 400 |
| Pen. @ 77° F.; minimum AASHTO t-49) | 220 | 140 | 80 | 60 | 50 | 40 |
| Flash Point, COC Minimum °F. | 325 | 350 | 425 | 450 | 450 | 450 |
| Ductility After TFOT (AASHTO T-179) @ 77° F., 5 cm/min, minimum | 100 | 100 | 75 | 50 | 40 | 25 |
| Viscosity After TFOT (AASHTO T-179) @ 140° F., poise minimum | 1000 | 2000 | 4000 | 8000 | 12000 | 16000 |

| TEST | AR1000 | AR2000 | AR4000 | AR8000 | AR16000 |
|---|---|---|---|---|---|
| Viscosity @ 140° F., poise (AASHTO T-202) | 1000 ± 250 | 2000 ± 500 | 4000 ± 1000 | 8000 ± 2000 | 16000 ± 4000 |
| Viscosity @ 275° F., cSt, minimum (AASHTO T-201) | 140 | 200 | 275 | 400 | 500 |
| Pen. @ 77° F., minimum (AASHTO T-49) | 65 | 40 | 25 | 20 | 20 |
| Percent of Original Pen. @ 77° F., minimum | — | 40 | 45 | 50 | 52 |
| Ductility @ 77° F., minimum, 5 cm/min | 100 | 100 | 75 | 75 | 75 |

As can be seen from the above, the art is replete with methods to improve the mixing of asphalt and polymer compositions. The needed elements for the commercial success of any such process include keeping the process as simple as possible, reducing the cost of the ingredients, and utilizing available asphalt cuts from a refinery without having to blend in more valuable fractions. In addition, the resulting asphalt composition must meet the above-mentioned governmental physical properties and environmental concerns. Thus, it is a target of the industry to reduce the cost of the polymers and crosslinking agents added to the asphalt without sacrificing any of the other elements.

SUMMARY OF THE INVENTION

In accordance with one embodiment of the present invention, the bitumen is heated up to the desired temperature in a stirred tank. The temperature in the tank is sufficient to allow the stirring of the asphalt and is usually 320° F. or more. A suitable rubber or thermoplastic elastomer is then added and mixing is continued for a period of time. Preferred thermoplastic elastomers are styrene butadiene copolymers having a styrene content of fifty percent (50%) or less. A composition of crosslinking agents comprising zinc-mercaptobenzothiazole and sulfur is introduced to the water emulsion. The emulsion or dispersion preferably has a crosslinking chemicals content of about fifty percent or more and are stable during shipping and storage. Preferably, the dispersion is an oil dispersion comprising about fifty percent (50%) active ingredients. In a preferred embodiment, the dispersion comprises an oil dispersion wherein the oil has a flash point above 450° F. and is liquid at room temperature. The crosslinking agents utilized in one embodiment comprised ZMBT (zinc 2-mercaptobenzothiazole): ZnO (zinc oxide): S (sulfur) in a 1:1:8 weight ratio.

DESCRIPTION OF THE INVENTION

As used herein, the term "bitumen" (sometimes referred to as "asphalt") refers to all types of bitumens, including those that occur in nature and those obtained in petroleum processing. The choice of bitumen will depend essentially on the particular application intended for the resulting bitumen composition. Preferred bitumens have an initial viscosity at 140° F. (60° C.) of 600 to 3000 poise depending on the grade of asphalt desired. The initial penetration range (ASTM D5) of the base bitumen at 77° F. (25° C.) is 50 to 320 dmm, preferably 75 to 150 dmm, when the intended use of the copolymer-bitumen composition is road paving. Bitumens which do not contain any copolymer, sulfur, etc., are sometimes referred to herein as a "base bitumen."

As used herein, the term "volatile solvent" refers to a hydrocarbon solvent which has a distillation point or range which is equal to or less than 350° C. Such solvents are known to vaporize to some extent under ambient conditions and, accordingly, pose environmental concerns relating to hydrocarbon emissions.

The term "substantially free of volatile solvent" means that the complete (final) bitumen composition contains less than about 3.5 weight percent of volatile solvent. Preferably, the bitumen composition contains less than about 2 weight percent of volatile solvent and more preferably, less than about 1 weight percent of volatile solvent.

"Elastomeric Polymers" are natural or synthetic rubbers and include butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated dienes. It is preferred to use styrene/conjugated diene block copolymers, linear, radial, or multi-branched. Styrene/butadiene and styrene/isoprene copolymers having an average molecular weight of between 30,000 and 300,000 have been found to be particularly useful in the present invention.

"Conjugated-dienes" refer to alkene compounds having 2 or more sites of unsaturation wherein a second site of unsaturation is conjugated to a first site of unsaturation, i.e., the first carbon atom of the second site of unsaturation is gamma (at carbon atom 3) relative to the first carbon atom of the first site of unsaturation. Conjugated dienes include, by way of example, butadiene, isoprene, 1,3-pentadiene, and the like.

"Block copolymers of styrene and conjugated-dienes" refer to copolymers of styrene and conjugated-dienes having a linear or radial, tri-block structure consisting of styrene-conjugated diene-styrene block units which copolymers are represented by the formula:

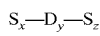

where D is a conjugated-diene, S is styrene, and x, y and z are integers such that the number average molecular weight of the copolymer is from about 30,000 to about 300,000. These copolymers are well known to those skilled in the art and are either commercially available or can be prepared from methods known per se in the art. Preferably, such tri-block copolymers are derived from styrene and a conjugated-diene, wherein the conjugated-diene is butadiene or isoprene. Such copolymers preferably contain 15 to 50 percent by weight copolymer units derived from styrene, preferably 25 to 35 percent derived from styrene, more preferably 28 to 31 percent derived from styrene, the remainder being derived from the conjugated diene. These copolymers preferably have a number average molecular weight range between 50,000 and 200,000, more preferably between 100,000 and 180,000. The copolymer can employ a minimal amount of hydrocarbon solvent in order to facilitate handling. Examples of suitable solvents include plasticizer solvent which is a non-volatile aromatic oil. However, when the hydrocarbon solvent is a volatile solvent (as defined above), care should be taken to ensure that the amount of solvent contained in the final bitumen composition is less than about 3.5 weight percent.

The term "sulfur" refers to elemental sulfur in any of its physical forms or any sulfur donating compound. Sulfur donating compounds are well known in the art and include various organic compositions or compounds that generate sulfur under the mixing or preparation conditions of the present invention. Preferably, the elemental sulfur is in powder form known as flowers of sulfur.

The term "desired Rheological Properties" refers to bitumen compositions having a viscosity at 140° F. (60° C.) of from 1600 to 4000 poise before aging; a toughness of at least 110 inch-pound (127 cm-kilograms) before aging; a tenacity of at least 75 inch-pound (86.6 cm-kilograms) before aging; and a ductility of at least 25 cm at 39.2° F. (4° C.) at 5 cm/min. pull rate after aging. Each of these desired Rheological Properties are necessary parameters in meeting the AC-20(R) specifications for bitumen compositions suitable for use as road pavement material (See Table 1).

Viscosity measurements are made by using ASTM test method D2171. Ductility measurements are made by using ASTM test method DI13. Toughness and tenacity measurements are made by a Benson Method of Toughness and Tenacity, run at 20 inches/minute (50.8 cm/minute) pull rate with a ⅛ inch (2.22 cm) diameter ball.

By "storage stable viscosity" it is meant that the bitumen composition shows no evidence of skinning, settlement, gelation, or graininess and that the viscosity of the composition does not increase by a factor of four or more during storage at 325°+−0.5° F. (163°+−2.8° C.) for seven days. Preferably the viscosity does not increase by a factor of two or more during storage at 325° F. (163° C.) for seven days. More preferably the viscosity increases less than 50% during seven days of storage at 325° F. (163° C.). A substantial increase in the viscosity of the bitumen composition during storage is not desirable due to the resulting difficulties in handling the composition and in meeting product specifications at the time of sale and use.

The term "aggregate" refers to rock and similar material added to the bitumen composition to provide an aggregate composition suitable for paving roads. Typically, the aggregate employed is rock indigenous to the area where the bitumen composition is produced. Suitable aggregate includes granite, basalt, limestone, and the like.

As used herein, the term "asphalt cement" refers to any of a variety of substantially unblown or unoxidized solid or semi-solid materials at room temperature which gradually liquify when heated. Its predominant constituents are bitumens, which may be naturally occurring or obtained as the residue of refining processing. The asphalt cements are generally characterized by a penetration (PEN, measured in tenths of a millimeter, dmm) of less than 400 at 25° C., and a typical penetration is between 40 and 300 (ASTM Standard, Method D-5). The viscosity of asphalt cement at 60° C. is more than about 65 poise. Asphalt cements are often defined in terms specified by the American Association of State Highway Transportation Officials (AASHTO) AR viscosity system. Two sets of typical specifications are shown in Table 1.

The asphalt terms used herein are well known to those skilled in the art. For an explanation of these terms, reference is made to the booklet SUPERPAVE Series No. 1 (SP-1), 1997 printing, published by the Asphalt Institute (Research Park Drive, P.O. Box 14052, Lexington, Ky 40512–4052), which is hereby incorporated by reference in its entirety. For example, Chapter 2 provides an explanation of the test equipment, terms, and purposes. Rolling Thin Film Oven (RTFO) and Pressure Aging Vessel (PAV) are used to simulate binder aging (hardening) characteristics. Dynamic Shear Rheometers (DSR) are used to measure binder properties at high and intermediate temperatures. This is used to predict permanent deformation or rutting and fatigue cracking. Bending Beam Rheometers (BBR) are used to measure binder properties at low temperatures. These values predict thermal or low temperature cracking. The procedures for these experiments are also described in the above-referenced SUPERPAVE booklet.

Asphalt grading is given in accordance with accepted standards in the industry as discussed in the above-referenced Asphalt Institute booklet. For example, pages 62–65 of the booklet include a table entitled Performance Graded Asphalt Binder Specifications. The asphalt compositions are given performance grades, for example, PG 64-22. The first number, 64, represents the average 7-day maximum pavement design temperature in °C. The second number, -22, represents the minimum pavement design temperature in °C. Other requirements of each grade are shown in the table. For example, the maximum value for the PAV-DSR test (°C.) for PG 64-22 is 25°C.

One of the methods commonly utilized in the industry to standardize the measure or degree of compatibility of the rubber with the asphalt is referred to as the compatibility test. The test comprises the mixing of the rubber and asphalt with all the applicable additives, such as the crosslinking agents. The mixture is placed in tubes, usually made of aluminum or similar material, referred to as cigar tubes or toothpaste tubes. These tubes are about one inch in diameter and about fifty centimeters deep. The mixture is placed in an oven heated to a temperature of about 162° C. (320° F.). This temperature is representative of the most commonly used asphalt storage temperature. After the required period of time, most commonly twenty-four (24) hours, the tubes are transferred from the oven to a freezer and cooled down to solidify. The tubes are kept in the vertical position. After cooling down, the tubes are cut in one thirds, three equal sections. The softening point of the top one third is compared to the softening point of the bottom section. This test gives an indication of the separation or compatibility of the rubber within the asphalt. The rubber would have the tendency to separate to the top. The lower the difference in softening point between the top and bottom sections, the more compatible are the rubber and asphalt. In today's environment, most states require a difference of 4° F. (2° C.) or less to consider the asphalt/rubber composition as compatible. Few standards allow a higher difference. The twenty-four hour test is used as a common comparison point.

In accordance with one embodiment of the present invention, an asphalt composition is prepared by adding the asphalt or bitumen to a mixing tank that has stirring means. The asphalt is added and stirred at elevated temperatures. Stirring temperatures depend on the viscosity of the asphalt and can range up to 500° F. Asphalt products from refinery operations are well known in the art. For example, asphalts typically used for this process are obtained from deep vacuum distillation of crude oil to obtain a bottom product of the desired viscosity or from a solvent deasphalting process that yields a demetalized oil, a resin fraction and an asphaltene fraction. Some refinery units do not have a resin fraction. These materials or other compatible oils of greater than 450° F. flash point may be blended to obtain the desired viscosity asphalt.

Rubbers, elastomeric polymers, or thermoplastic elastomers suitable for this application are well known in the art as described above. For example, Finaprene products available from Fina Oil and Chemical Company are suitable for the applications of the present invention. This example is not limiting for the technology which can be applied to any similar elastomeric product particularly those produced from styrene and butadiene.

Various crosslinking agents for asphalt applications were tested as shown in the tables below. In a preferred embodiment, elemental sulfur and organic zinc compounds are used. These crosslinking agents are normally sold in powder or flake form.

TABLE 2

| Number | 932-163 | 950-38 | 950-39 |
|---|---|---|---|
| % Asphalt | 100 | 95.69 | 95.6 |
| % Rubber | | 3.99 | 3.98 |
| % ZMBT | | 0.2 | 0.1025 |
| % ZnO | | | 0.2 |
| % Sulfur | | 0.12 | 0.12 |
| 24 hour compat, top, F. | | 156 | 173.4 |
| 24 hour compat, difference, F. | | 1.9 | 10.4 |
| Binder DSR | 65.9 | 81.4 | |
| RTFO DSR | 66.4 | 77.8 | |
| PAV DSR | 22.2 | 18.8 | |
| BBR m Value | −14.68 | −18.35 | |
| BBR s value | −13.89 | −18.34 | |
| PG Grade | PG64-22 | PG76-28 | |

The data in Table 2 shows the values for a control sample without any rubber addition and samples where elemental sulfur was used in addition to organic zinc and zinc oxide. The organic zinc is zinc 2-mercaptobenzothiazole (CAS Reg. No.: 155-04-4), hereinafter referred to as ZMBT. The rubber utilized is Finaprene 401, available from Fina Oil and Chemical Company in Dallas, Tex. Finaprene 401 is a styrene-butadiene block copolymer having a butadiene/styrene ratio of 78/22. Two procedures were utilized for testing the present invention in two separate refineries. The procedures vary in temperature and only depend on the capabilities or nuances of the refinery. The results are comparable regardless of the procedure. The stirring time can also vary depending on the asphalt and how easily compatibility is obtained.

In one procedure, the asphalt was added to the tank and stirred at 340° F. at 2500 rpm for 45 minutes. The shear rate was subsequently reduced to 500 rpm and the temperature increased to 350° F. The crosslinking agents were added and stirring was continued for one hour. Samples were taken and placed in an oven for 24 hours to conduct the compatibility test. SHRP tests may also be run.

In the second procedure, the rubber was sheared into the asphalt at 350° F. at 2500 rpm for 45 minutes. The mixture was placed on the low shear mixer and the temperature was adjusted to the desired level. The crosslinking agent was added and stirring was continued for one hour while raising the temperature to 380° F. Samples were taken for testing.

Unless otherwise indicated, the first procedure is utilized in reporting the data.

For the experiments shown in Tables 3–5, an asphalt product was used. The asphalt is an AC-30 product prepared from asphaltenes, and outside flux oils. It is the starting material for all the other blends. This is a particularly difficult cut to make rubber compatible. This asphalt has about a 30° F. separation on the compatibility test with Finaprene 401 (FP401). For this set of experiments, the asphalt was heated to 340° F. A high shear mixer was used at 2500 rpm before adding 4% of FP401. After 45 minutes, the mixture was placed on low shear at 250 rpm and the temperature was adjusted to the desired level. The crosslinking agent was added either in powder form or as an emulsion as indicated in the tables. The mixture was stirred for 30 minutes after the addition of the crosslinking agent. Samples were taken for compatibility tests and other tests such as DSR. The mixture was stirred for another 30 minutes and additional samples were taken for testing. With some samples, heating was continued for 4 hours with samples taken every hour.

TABLE 3

| Number | 11 | 14 | control | 15 | 16 | 17 |
|---|---|---|---|---|---|---|
| % Asphalt | 100 | 100 | 100 | 100 | 100 | 100 |
| % Rubber | 4 | 4 | 0 | 4 | 4 | 4 |
| Temperature (F.) | 380 | 350 | | 350 | 380 | 320 |
| Speed low shear mixer (RPM) | 750 | 750 | | 750 | 750 | 750 |
| Time on low shear (hours) | 5 | 5 | | 1 | 1 | 1 |
| % ZMBT | 0.01 | 0.01 | 0 | 0.01 | 0.01 | 0.01 |
| % ZnO | 0.008 | 0.008 | 0 | 0.008 | 0.008 | 0.008 |
| % Sulfur | 0.06 | 0.06 | 0 | 0.06 | 0.06 | 0.06 |
| Binder DSR | | | 67.9 | 82.1 | 82.9 | 82.4 |
| RTFO DSR | | | 69.4 | 78.7 | 78.8 | 79.6 |
| PAV DSR | | | 27.1 | 24.6 | 24 | 24.3 |
| BBR m Value | | | −13.63 | −10.97 | −10 | −9.49 |

TABLE 3-continued

| Number | 11 | 14 | control | 15 | 16 | 17 |
|---|---|---|---|---|---|---|
| BBR s value | | | −14.58 | −16.09 | −16.02 | −16.19 |
| PG Grade | | | | | | |
| Compatibility, 1 hour | 24 | | | | | |
| Compatibility, 2 hour | 7.7 | | | | | 27.8 |
| Compatibility, 3 hour | 2 | 22.3 | | | | |
| Compatibility, 4 hour | 0.9 | 13 | | | | 21 |
| Compatibility, 5 hour | | 5.8 | | | | 28.9 |
| Compatibility, 24 hour | | 1.5 | | 8.3 | 5 | 5.9 |
| Compatibility, 48 hour | | | | v | | 1.8 |

TABLE 4

| Number | 23 | 24 | 45 |
|---|---|---|---|
| % Asphalt | 100 | 100 | 100 |
| % Rubber | 4 | 4 | 4 |
| Temperature (F.) | 350 | 350 | 350 |
| Speed low shear mixer (rpm) | 750 | 750 | 750 |
| Time on low shear (hours) | 1 | 1 | 1 |
| % ZMBT | 0.01 | 0.013 | 0.017 |
| % ZnO | 0.008 | 0.01 | 0.013 |
| % Sulfur | 0.06 | 0.075 | 0.1 |
| Aquamix including water | 0.16 | 0.2 | 0.25 |
| Binder DSR | 80 | 80.5 | 82.7 |
| RTFO DSR | 79.8 | 79.3 | 78.9 |
| PAV DSR | 23.5 | 24.5 | 23.3 |
| BBR m Value | −11.14 | −10.73 | −14.67 |
| BBR s value | −16.57 | −16.73 | −18.24 |
| Compatibility, 24 hour | 6.9 | 3.8 | 0.8 |

TABLE 5

| Number | 21 | 22 | 9 | 20 | 8 | 10 | 12 | 13 | 18 | 19 |
|---|---|---|---|---|---|---|---|---|---|---|
| % Asphalt | 100 | 100 | 100 | 100 | 100 | 100 | 100 | 100 | 100 | 100 |
| % Rubber | 4 | 4 | 4 | 4 | 4 | 4 | 4 | 4 | 4 | 4 |
| Temperature (F.) | 380 | 350 | 350 | 365 | 350 | 380 | 380 | 350 | 350 | 380 |
| Speed low shear mixer (rpm) | 750 | 750 | 750 | 750 | 750 | 750 | 750 | 750 | 750 | 750 |
| Time on low shear (hours) | 3 | 3 | 5 | 1 | 5 | 5 | 5 | 5 | 1 | 1 |
| % ZMBT | 0.01 | 0.01 | 0.03 | 0.03 | 0.05 | 0.05 | 0.05 | 0.05 | 0.05 | 0.05 |
| % ZnO | 0.008 | 0.008 | 0.012 | 0.012 | 0.004 | 0.004 | 0 | 0 | 0 | 0.004 |
| % Sulfur | 0.06 | 0.06 | 0.12 | 0.12 | 0.3 | 0.1 | 0.3 | 0.1 | 0.1 | 0.1 |
| Binder DSR | 81.8 | 81.9 | | | | | | | | |
| RTFO DSR | 78.7 | 79 | | | | | | | | |
| PAV DSR | 23.4 | 24.9 | | | | | | | | |
| BBR m Value | −11.27 | −11.28 | | | | | | | | |
| BBR s value | −16.64 | −16.73 | | | | | | | | |
| PG Grade | | | | | | | | | | |
| Compatibility, 1 hour | | | 10.7 | | Gelled | 11.5 | Gelled | 11.5 | | |
| Compatibility, | | | 3 | | | 1.5 | | 10.4 | | |

TABLE 5-continued

| Number | 21 | 22 | 9 | 20 | 8 | 10 | 12 | 13 | 18 | 19 |
|---|---|---|---|---|---|---|---|---|---|---|
| 2 hour Compatibility, |  |  | 2.7 |  |  | 1 |  | 4.5 |  |  |
| 3 hour Compatibility, |  |  | 1 |  |  | 0.4 |  | 2.4 |  |  |
| 4 hour Compatibility, |  |  | 2.3 |  |  | 0.7 |  |  |  |  |
| 5 hour Compatibility, | 1.9 | 4.2 |  | 3 |  |  |  |  | 3 | 0 |
| 24 hour Compatibility, |  |  |  |  |  |  |  |  |  |  |
| 48 hour |  |  |  |  |  |  |  |  |  |  |

As indicated from the data above, one must utilize at least 0.06% elemental sulfur to render the asphalt and rubber composition compatible. The crosslinking reaction is dependent on the temperature of the asphalt (see runs 11, 14 and 17). Comparing blend 11 versus blend 16 and blend 14 versus blend 15, shows that prolonged stirring after the addition of the crosslinking agent improves the compatibility of the rubber and asphalt. Blends 9, 20,8,10 and 12 show that one can obtain gels at high sulfur concentrations (0.3% relative to asphalt) and zinc (ZMBT+ZnO=0.05%) levels. Blends 16, 17, 20, 18 and 19 indicate that SHRP properties are affected by the amount of ZMBT and ZnO added to the asphalt. The upper grades and the s-value were not affected by the addition of the crosslinking agent. It the concentration of ZMBT and ZnO (ZMBT+ZnO) is lower than 0.03%, the bottom grade (m-value) of the asphalt increases (worsens) by 2° C. Conversely, if the total zinc concentration is equal to or greater than 0.03%, the m-value is decreased (improved) by 2° C. Table 5 shows the results of adding the crosslinking agents as an emulsion. The emulsion used a ratio of ZMBT/ZnO/S of 0.01/0.008/0.06. The emulsion was about 50% water.

Blends 24 and 25 further confirm the need for at least 0.03% total zinc to decrease the m-value by 2° C.

The above results show that the crosslinking reaction is temperature dependent. The minimum practical temperature is 320° F. If mixing is adequate, one can reduce the time for crosslinking by increasing the temperature. The effect between 320° F. and 340° F. is dramatic. It is believed that this effect is because cyclic sulfur opens to linear sulfur at the higher temperature. The minimum sulfur concentration is 0.06% based on the asphalt.

TABLE 6

| Block | 1-2 | 2-2 | 3-2 | 4-2 | 1-3 | 2-3 | 3-3 | 4-3 |
|---|---|---|---|---|---|---|---|---|
| ZMBT % | 0.005 | 0.005 | 0.02 | 0.02 | 0.02 | 0.02 | 0.005 | 0.005 |
| ZnO % | 0.005 | 0.02 | 0.02 | 0.005 | 0.02 | 0.005 | 0.005 | 0.02 |
| S % | 0.06 | 0.06 | 0.06 | 0.06 | 0.12 | 0.12 | 0.12 | 0.12 |
| Temp, F. | 320 | 320 | 320 | 320 | 320 | 320 | 320 | 320 |
| Sample Number | 933-114 | 933-122 | 933-131 | 933-138 | 933-115 | 993-123 | 933-132 | 933-139 |
| Compatibility | 18.5 | gelled | 14.8 | 14.5 | gelled | 14.3 | gelled | gelled |
| Binder DSR | 82.1 |  | 84.4 | 81.4 |  | 81 |  |  |
| RTFO DSR | 77.9 |  | 78 | 78.1 |  | 78.1 |  |  |
| PAV DSR | 27.4 |  | 23.2 |  |  | 24.7 |  |  |
| BBR m | −12.94 |  | −12 |  |  | −13.23 |  |  |
| BBR S | −13.7 |  | −14.25 |  |  | −14.68 |  |  |
| Comments |  |  |  |  |  |  |  | *1 |

*1 gelled very slowly

TABLE 7

| Block | 1-1 | 2-1 | 3-1 | 4-1 | 1-4 | 2-4 | 3-4 | 4-4 |
|---|---|---|---|---|---|---|---|---|
| ZMBT % | 0.013 | 0.013 | 0.013 | 0.013 | 0.02 | 0.02 | 0.005 | 0.005 |
| ZnO % | 0.013 | 0.013 | 0.013 | 0.013 | 0.005 | 0.02 | 0.02 | 0.005 |
| S % | 0.09 | 0.09 | 0.09 | 0.09 | 0.06 | 0.06 | 0.06 | 0.06 |
| Temp, F. | 335 | 335 | 335 | 335 | 350 | 350 | 350 | 350 |
| Sample Number | 933-113 | 933-118 | 933-130 | 933-137 | 933-116 | 933-124 | 933-133 | 933-142 |
| Compatibility | 0.8 | 1.3 | 14.5/7.8 | 15.9 | 16.1 | 12.6 | 15.8 | 8.4 |
| Binder DSR | 82.7 | 82.2 | 82.4 | 84.4 | 83.9 | 81.7 | 83.1 | 83.5 |
| RTFO DSR | 79.2 | 78.5 | 79.2 | 77.9 | 79.5 | 79 | 77.5 | 78.1 |
| PAV DSR | 25.4 | 23.3 | 23.4 |  | 25.5 | 26.4 | 26.3 | 25 |
| BBR m | −14.76 | −13.7 | −13.78 |  | −9.94 | −10.31 | −10.73 | −10.95 |
| BBR S | −14.68 | −15 | −14.68 |  | −14.21 | −13.24 | −13.05 | −12.43 |
| Comments |  |  |  |  |  |  |  |  |

TABLE 8

| Block | 1-5 | 2-5 | 2-5a | 3-5 | 4-5 |
|---|---|---|---|---|---|
| ZMBT % | 0.005 | 0.005 | 0.005 | 0.02 | 0.02 |
| ZnO % | 0.02 | 0.005 | 0.005 | 0.005 | 0.02 |
| S % | 0.012 | 0.012 | 0.012 | 0.012 | 0.012 |
| Temp, F. | 350 | 350 | 350 | 350 | 350 |
| Sample Number | 933-117 | 933-125 | 933-129 | 933-136 | 933-143 |
| Compatibility | 1.7 | 3.7 | 1.5 | 2.3 | 1 |
| Binder DSR | 82.9 | 83.2 | | 82.9 | 82.8 |
| RTFO DSR | 78.5 | 78.4 | | 77.8 | 77.4 |
| PAV DSR | 23.6 | 24.7 | | 23 | 22.7 |
| BBR m | −14.48 | −14.03 | | −14 | −14.73 |
| BBR S | −15.12 | −14.91 | | −14.77 | −15.02 |
| Comments | *2 | | | *3 | *4 |

*2 thin hard crust
*3 small thin hard crust 1/8 of surface
*4 small thin hard crust 1/6 of surface

TABLE 9

| Block | 5-1 | 5-2 | 5-3 | 5-4 | 99-38 | 99-38 |
|---|---|---|---|---|---|---|
| ZMBT % | 0.013 | 0.005 | 0.02 | 0.005 | 0.005 | 0.02 |
| ZnO % | 0.013 | 0.02 | 0.02 | 0.005 | 0.02 | 0.02 |
| S % | 0.09 | 0.12 | 0.12 | 0.06 | 0.12 | 0.12 |
| Temp, F. | 335 | 380 | 380 | 380 | 350 | 350 |
| Sample Number | 933-151 | 933-156 | 933-157 | 933-160 | 933-158 | 933-159 |
| Compatibility | 14.9 | 2.4 | 1.2 | 11.4 | *5 | *5 |
| Binder DSR | 81.29 | 90.7 | 83.1 | 81.6 | | |
| RTFO DSR | 79.19 | 7823.1 | 79.7 | 73.9 | | |
| PAV DSR | 22.6 | −15.32 | 23.2 | 23.9 | | |
| BBR m | −13.5 | −15.15 | −15.17 | 23.9 | | |
| BBR S | −15.24 | | −14.38 | −12.93 | | |
| Comments | | | | −13.85 | | |

*5 gelled while aging
*6 gelled while aging

The data shown in Tables 6–9 give the results of various experiments varying the crosslinking compounds and the temperature for crosslinking.

While certain representative embodiments and details have been shown for the purpose of illustrating the subject invention, it will be apparent to those skilled in the art that various changes and modifications can be made therein without departing from the scope of the subject invention.

What we claim is:

1. A method for preparing asphalt and polymer compositions comprising:

heating the asphalt in a stirred tank to a temperature sufficient to allow stirring of the asphalt in the tank, wherein said temperature is at least 330° F.;
    adding a thermoplastic elastomer to the tank in an amount not greater than twelve percent by weight of the total composition to form a mixture;
    adding a crosslinking composition to the composition;
    continue stirring and maintain the temperature in the tank for at least sixty minutes,
    wherein the crosslinking composition comprises at least 0.02 percent by weight based on the asphalt of zinc 2-mercaptobenzothiazole, and from 0.06 to 0.3 percent based on the asphalt of elemental sulfur.

2. The method of claim 1 wherein the crosslinking composition further comprises zinc oxide in amounts of at least 0.005 percent by weight.

3. The method of claim 2 wherein the total zinc compounds concentration is at least 0.03 percent by weight.

4. The method of claim 1 wherein the asphalt is heated to a temperature not greater than 380° F. prior to the addition of the crosslinking composition.

5. The method of claim 1 wherein the thermoplastic elastomer is a styrene-butadiene polymer.

6. The method of claim 1 wherein the crosslinking composition comprises 0.01 dithiodimorpholine as a replacement for an equivalent amount of the elemental sulfur.

7. The process of claim 1 wherein the temperature of the asphalt is increased by at least 10° F. prior to the addition of the crosslinking composition.

8. The asphalt composition made in accordance with claim 1 wherein the asphalt properties comply with Federal standards for grade AC-20.

9. A method for preparing an asphalt and thermoplastic elastomer composition comprising the steps of:

heating an asphalt cut in a stirred tank to a temperature offrom 330 to 450° F.;
    adding the thermoplastic elastomer to the asphalt while continuing to stir the asphalt; stirring the mixture at a speed and for a period of time sufficient to increase the distribution of the elastomer into the asphalt;
    adding a crosslinking composition to the tank and continuing stirring for a period of time sufficient to improve the distribution of the crosslinking agent dispersion in the asphalt,
    wherein the crosslinking composition comprises at least 0.02 percent by weight based on the asphalt of zinc 2-mercaptobenzothiazole, and from 0.06 to 0.3 percent based on the asphalt of elemental sulfur.

10. The method of claim 9 wherein the crosslinking composition further comprises zinc oxide in amounts of at least 0.005 percent by weight.

11. The method of claim 9 wherein the thermoplastic elastomer is a styrene-butadiene polymer.

12. The method of claim 9 wherein the crosslinking composition comprises at least 0.12% elemental sulfur.

13. The asphalt composition made in accordance with claim 9 wherein the asphalt properties comply with Federal standards for grade AC-20.

14. A method for preparing an asphalt and a styrene butadiene thermoplastic elastomer composition comprising the steps of:

heating an asphalt cut in a stirred tank to a temperature of from 350 to 450° F.,
    adding the styrene butadiene thermoplastic elastomer to the asphalt while continuing to stir the asphalt;
    stirring the mixture at a speed and for a period of time sufficient to increase the distribution of the elastomer into the asphalt;

adding a crosslinking composition to the tank and continuing stirring for a period of at least sixty minutes, wherein the crosslinking composition comprises at least 0.02 percent by weight based on the asphalt of zinc 2-mercaptobenzothiazole, and from 0.06 to 0.3 percent based on the asphalt of elemental sulfur.

15. The method of claim 14 wherein the crosslinking composition further comprises zinc oxide in amounts of at least 0.005 percent by weight.

16. The asphalt composition made in accordance with claim 15 wherein the asphalt properties comply with Federal standards for grade AC-20.

17. The method of claim 14 wherein the crosslinking comprises at least 0.12% elemental sulfur.

18. The method of claim 2 wherein the ratio of zinc 2-mercaptobenzothiazole to zinc oxide to elemental sulfur is 0.01/0.008/0.06.

* * * * *